United States Patent [19]

Ogawa et al.

[11] Patent Number: 5,235,902
[45] Date of Patent: Aug. 17, 1993

[54] DRINKS MAKER

[75] Inventors: Akira Ogawa, Mishima; Minoru Sasaki, Shizuoka, both of Japan

[73] Assignee: Toshiba Machine Co., Ltd., Tokyo, Japan

[21] Appl. No.: 870,315

[22] Filed: Apr. 17, 1992

[30] Foreign Application Priority Data

Apr. 19, 1991 [JP] Japan .................. 3-26923[U]

[51] Int. Cl.⁵ ............................ A47J 31/02
[52] U.S. Cl. .......................... 99/300; 99/305; 99/316; 222/146.1; 222/129
[58] Field of Search ............ 99/279, 284, 295, 300, 99/304, 305, 306, 307, 316; 426/433; 222/131, 144.5, 146.1, 547, 129

[56] References Cited

U.S. PATENT DOCUMENTS

| | | | |
|---|---|---|---|
| 3,590,724 | 7/1971 | Lorang | 99/306 |
| 4,433,617 | 2/1984 | Magnusson | 99/295 |
| 4,579,048 | 4/1986 | Stover | 99/295 |
| 4,603,620 | 8/1986 | Daugherty | 99/284 |
| 5,080,008 | 1/1992 | Helbling | 99/306 |

FOREIGN PATENT DOCUMENTS 51-39584  10/1976  Japan .
58-3188   1/1983   Japan .

*Primary Examiner*—Harvey C. Hornsby
*Assistant Examiner*—Reginald L. Alexander
*Attorney, Agent, or Firm*—Oblon, Spivak, McClelland, Maier & Neustadt

[57] ABSTRACT

The coffee maker of the present invention has a guiding gutter formed movably below a basket for containing ground coffee beans. In the first state, the guiding gutter guides coffee extract obtained from the basket directly into a cooling tank having a freezing section. In the second state, the guiding gutter let the coffee extract obtained from the basket fall into a pot situated below the basket.

11 Claims, 5 Drawing Sheets

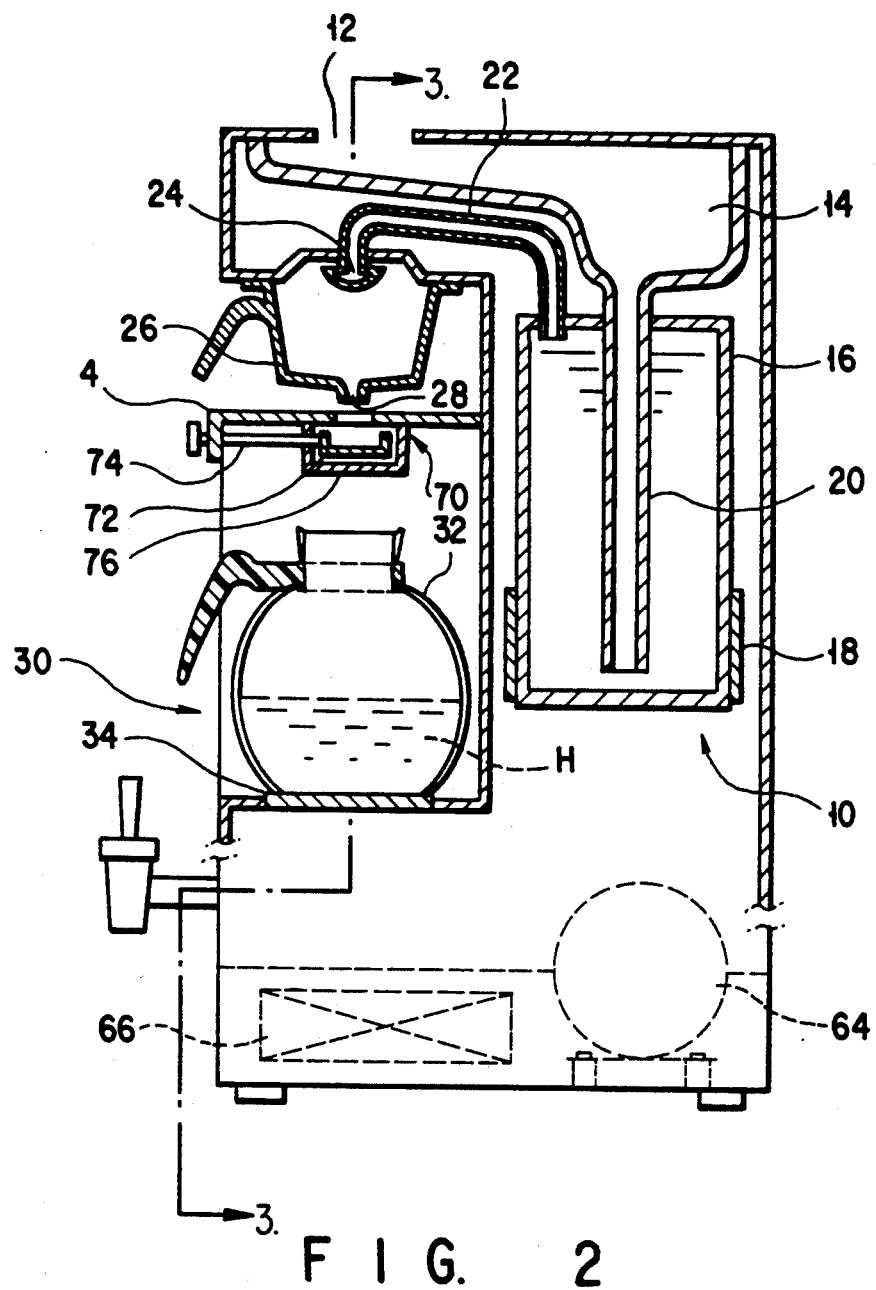
F I G. 2

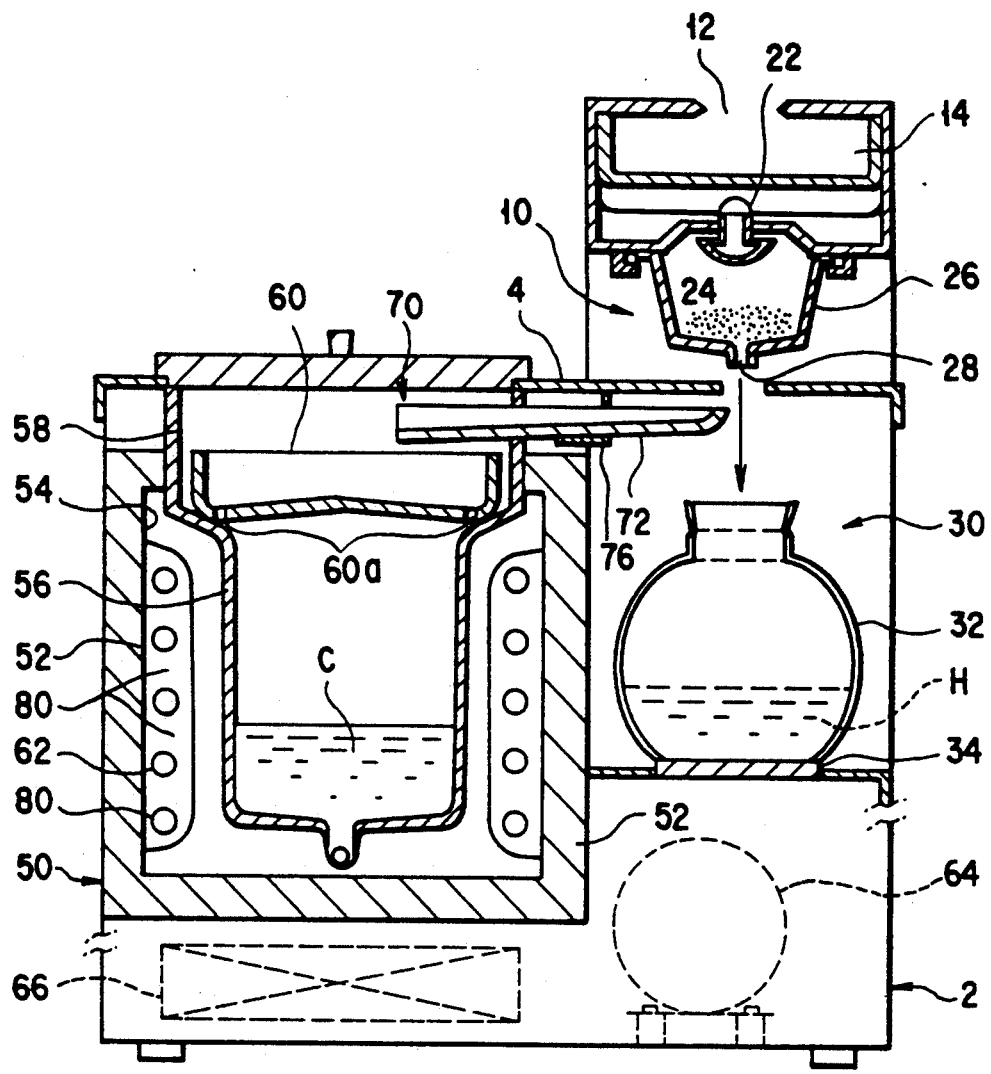
F I G. 3

DRINKS MAKER

BACKGROUND OF THE INVENTION

1. Field of the Invention

This invention relates to a drinks maker, and more specifically a coffee maker wherein hot water is poured in drink materials such as ground coffee beans and drip coffee (drinks) is brewed.

2. Description of the Related Art

A coffee maker for brewing drip coffee includes, in general, a water reservoir in which a full amount of water is supplied by an operator, a heater element for heating the water in the reservoir, a basket in which ground coffee or material of drip coffee is supplied by the operator, a hot water supply pipe through which hot water is guided to the basket, a server for containing drip coffee brewed in the basket with hot water supplied, and a warmer for warming the coffee in the server.

In this type of coffee maker, an amount of ground coffee corresponding to a desired number of cups is put in the basket and then corresponding water is put in the water reservoir. The water in the reservoir is heated by the heater in advance and changed with the water, and the hot water equivalent in amount to the water is poured in the basket containing the ground coffee. Consequently, a coffee extract of the ground coffee is obtained and received in the server as drip coffee. The drip coffee is warmed at a desired temperature by the warmer as hot coffee.

When cold coffee is desired, hot coffee obtained by the coffee maker, etc. is, in general, cooled with ice cubes or cooled in a freezing tank. There is known, for example, a cold coffee maker having a refrigerating compressor, a condenser and a tank, or a refrigerator and a tank, for supplying cold coffee while constantly cooling hot coffee made by the coffee maker In order to prepare hot coffee and cold coffee at a time, it is necessary, however, to provide both a hot coffee maker and the cold coffee maker. This results in an increase in space for installing the two coffee makers and in cost. Even if there is such a space for installation, it is necessary to transfer hot coffee extracted by the hot coffee maker into the cold coffee maker. Further, when hot coffee is extracted by the hot coffee maker and thereafter coffee for making cold coffee is extracted via the hot coffee maker, the hot coffee may cool down while the coffee for making cold coffee is being extracted since the hot coffee extracted must once be removed from the warmer.

SUMMARY OF THE INVENTION

An object of the present invention is to provide a drinks maker capable of keeping various drinks having different temperatures suitable for drinking and keeping, at optimal temperatures.

Another object of the invention is to provide a hot/- cold coffee maker capable of serving hot coffee and cold coffee at a time.

Still another object of the invention is to provide a multi-functional coffee maker capable of serving hot coffee and cold coffee, wherein hot coffee (cold coffee), having the optimal temperatures, can be served while cold coffee (hot coffee) is being extracted, and cold coffee can be made without transferring hot coffee extracted for cold coffee.

According to the present invention, there is provided a drinks maker comprising: drinks dispensing means including basket means for containing a material in which hot water is poured to obtain drinks, and being capable of serving various kinds of drinks in accordance with the material; guiding means movable between a first position where the guiding means receives the drinks fed from the drinks dispensing means and a second position where the guiding means does not receive the drinks fed from the drinks dispensing means, the guiding means guiding the drinks discharged from the basket means to receiving means situated in accordance with the first position or the second position; first receiving means situated in accordance with the first position of the guiding means, the first receiving means keeping the drinks at a temperature different from the temperature which the drinks have when the drinks have just been discharged; and second receiving means situated in accordance with the second position of the guiding means, the second receiving means keeping the drinks at a temperature which the drinks have when the drinks have just been discharged.

According to the invention, there is also provided a coffee maker comprising: a water heating section, having a heater element and a hot water pipe, for supplying hot water heated by the heater element to a desired position therethrough; a hot drinks dispensing section including sprinkler means, situated at an end portion of the hot water pipe of the water heating section, for sprinkling the hot water, a basket element situated just below the sprinkler means for containing a material in which the hot water is sprinkled to obtain hot drinks, the basket element having a discharge opening at its bottom portion for dripping the hot drinks made with the hot water, and a reservoir element, situated below the basket element, for keeping the hot drinks falling from the basket element; a cold drinks dispensing section, situated near the hot drinks dispensing section, including a cooling tank formed within a water tank and freezing means for cooling the cooling tank, the cold drinks dispensing section cooling the hot drinks fed from the hot drinks dispensing section and keeping cooled cold drinks; and deriver means situated between the basket element and the reservoir element of the hot drinks dispensing section, the deriver means taking a position capable of receiving the hot drinks falling from the basket element and a position not capable of receiving the hot drinks falling form the basket element, thereby letting the hot drinks from the basket element fall selectively into the reservoir element or into the cooling tank of the cold drinks dispensing section.

According to the drinks maker of the present invention, hot drink and cold drink can be served at a time. Hot drink (cold drink) can be served while cold drink (hot drink) is being extracted, and cold drink can be made without transferring hot drink extracted for cold drink.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a cross-sectional view taken along line 2—2 in FIG. 1;

FIG. 3 is a cross-sectional view taken along line 3—3 in FIG. 2, showing the state wherein hot coffee is extracted by the coffee maker;

DETAILED DESCRIPTION OF THE PREFERRED EMBODIMENTS

Figure 1:
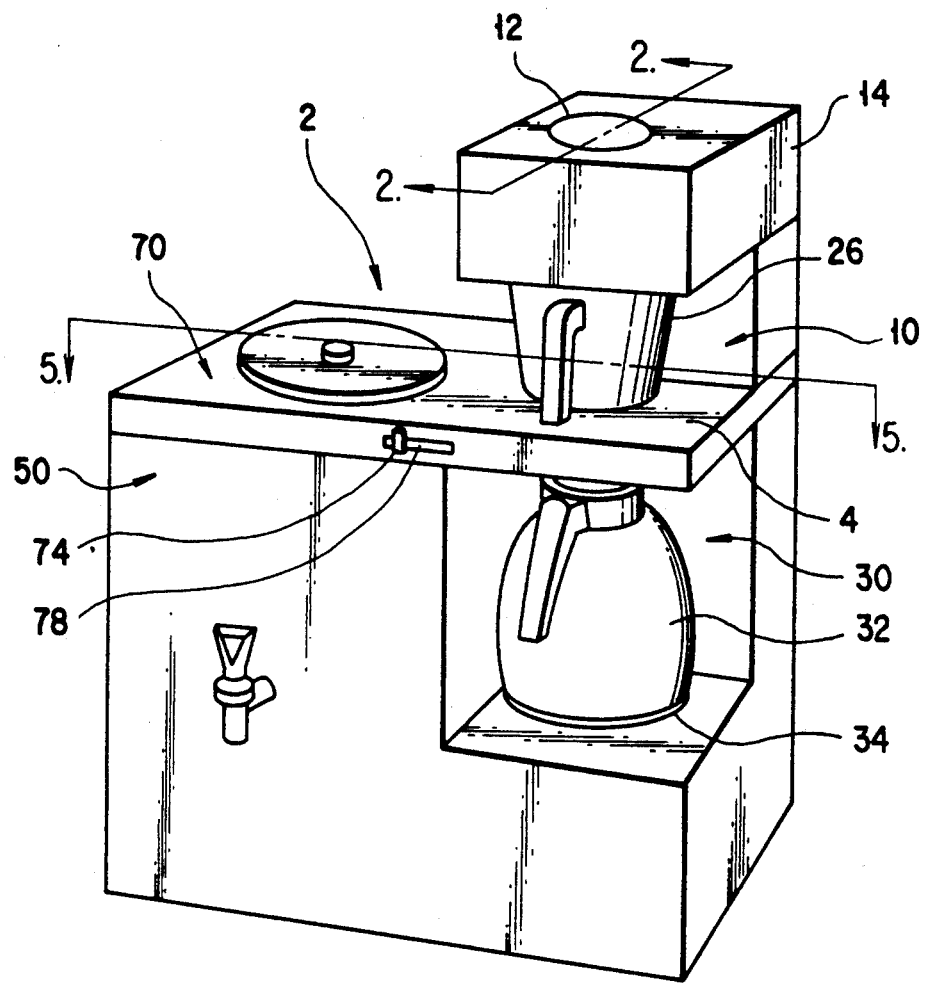
FIG. 1 shows schematically a multi-functional coffee maker according to an embodiment of the present invention.

FIGS. 1 to 4 show a coffee maker according to a first embodiment of the present invention.

A hot and cold coffee maker (drinks maker) 2 includes a coffee brewing section 10, a warming unit 30, a cooling unit 50, and a guiding unit 70. In the coffee brewing section 10, hot water is poured in ground coffee, thereby obtaining coffee extract. The warming unit 30 warm and keeps the obtained coffee extract at an optimal temperature as hot coffee to be served for the consumer. The cooling unit 50 cools and keeps the coffee extract at an optimal temperature as cold coffee to be served for the consumer. The guiding unit 70 causes the coffee extract to be guided selectively into the warming unit 30 or the cooling unit 50.

The coffee brewing section 10 contains a water inlet 12 through which water for obtaining coffee extract is poured, and a reservoir tank 14 for temporarily containing water which is used as hot water in extracting coffee. Water, before poured in the reservoir tank 14, is filled in a water heater 16 and heated to the boiling point of water. The water heater 16 for heating water poured in the tank 1 is situated below the tank 14. A heater element 18 for heating the water heater 16 is provided around the water heater 16, and preferably at the bottom of the heater 16. The tank 14 is made to communicate with the heater 16 via a water pipe 20 extending downward from the bottom of the tank 14.

A hot water tube 22 is situated at a position higher than the position where the water in the tank 14 falls into the water heater 16 through the water pipe 20. Hot water heated by the water heater 16 with the heater element 18 is guided into a basket (described below) or ground coffee beans through the hot water tube 22. A sprinkler 24 is connected at an end portion of the tube 22 opposite to the end portion inserted in the water heater 16. The sprinkler 24 sprinkles hot water heated by the water heater 16 onto the ground coffee beans (described below).

The water heater 16 and heater element 18 may be omitted, depending on the size of the coffee maker. In this case, it is publicly known to replace the water pipe 20 by a heating tube (not shown) having a heating element. The water in the reservoir 14 is heated, while it is being guided to the sprinkler 24.

A filter basket 26 is removably arranged just under the sprinkler 24. The filter basket 26 contains ground coffee beans, provided by the operator, from which coffee extract is obtained. The filter basket 26 has a circular conical shape or a circular truncated conical shape. The filter basket 26 has a brew hole 28 for surely dripping all of the coffee extract being brewed. The brew hole 28 is situated along the axis of the conical shape (or at a vertex of the cone, i.e., the lowest point of the cone). Generally, a filter (not shown) for preventing particles of the ground coffee beans from falling in the coffee extract is provided in the basket 26. In this case, the basket 26 itself may have such a mesh size that no ground coffee beans pass through the basket 26.

The warming unit 30 for serving the coffee extract to the consumer as hot coffee and the cooling unit 50 for serving it as cold coffee are situated on the down side of the brew hole 28 of the filter basket 26 (i.e., the brewing section 10) through which the coffee extract is discharged. The guiding unit 70 for guiding the coffee extract selectively into the unit 30 or unit 50 is disposed between the filter basket 26 and the units 30 and 50. A top cover 4 for covering both units 30 and 50 is disposed between the warming unit 30 and the brew hole 28. The cover 4 prevents dust from entering the units 30 and 50, and constitutes a body in which the guiding unit 70 is secured.

The guiding unit 70 has a guide element 72 and a handle (knob) 74. The guide element 72 is movable between a first position (FIG. 4) where it can receive all coffee extract discharged from the brew hole 28 of the filter basket 26 and a second position (FIG. 3) where it does not contact the coffee extract. The guide element 72 is operated by the operator by means of the handle 74. The operation of the guiding unit 70 will be described later in greater detail.

The warming unit 30 is situated just below the brew hole 28 of the filter basket 26 of the brewing section 10. As has been described, hot water is normally poured in ground coffee beans to obtain coffee extract as hot coffee. The coffee extract discharged from the filter basket 26 (brewing section) has a temperature suitable as hot coffee. Accordingly, in order to serve hot coffee to a consumer (or operator), it suffices that the coffee extract is warmed without lowering the temperature thereof. The warming unit 30 situated just under the brew hole 28 includes a pot (decanter or server) 32 for containing coffee extract falling from the brew hole 28 (filter basket) 26, and a warmer 34 on which the pot 32 is held. The pot 32 is provided with a lip spout and a handle for making it easy to serve hot coffee. The warmer 34 is combined with a heating element (not shown) for warming the pot 32 and the coffee extract in the pot 32.

In the case, as a matter of course, the guiding unit 70 is moved to the second position selected by the operator, where it does not contact the coffee extract. As is clear from FIGS. 2 to 4, a large hole (not indicated by a reference numeral) for allowing passage of coffee extract from the brew hole 28 to the warming unit 30 is formed at that part of the top cover 4 which is situated between the warming unit 30 and the brew hole 28.

On the other hand, the cooling unit 50 for cooling and keeping the coffee extract to be served as cold coffee is situated adjacent to the warming unit 30. The cooling unit 50 includes a water tank 54 surrounded by a heat-insulating member 52, and a cooling tank 56, formed inside the water tank 54, for cooling and keeping the coffee extract fed from the brewing section 10. The cooling tank 56 is provided with a spout valve (not indicated by a reference numeral) for serving cold coffee. The spout valve penetrates the water tank 54 and the heat-insulating member 52 and projects outwardly.

A cooling tube 58 having a greater diameter than that of the cooling tank 56 is formed at the upper part of the cooling tank 56. A pan 60 is set on an inclined face (not indicated by a reference numeral) defined between the cooling tube 58 and the cooling tank 56, in order to efficiently cool the coffee extract guided from the brewing section 10 via the guiding unit 70. The pan 60 has a bottom portion which has a center area bulging, as compared with its peripheral area. The peripheral area of the bottom portion of the pan 60 has holes 60a for causing the coffee extract to enter the cooling tank 56. An outer cap (not indicated by a reference numeral) is attached provided above the pan 60. The outer cap makes it possible to pour drinks into the cooling unit 50 from the outside.

A freezing pipe 62, having, e.g., a coil shape, for cooling coffee extract discharged in the cooling tank 56 is disposed in the space between the outer peripheral surface of the cooling tank 56 and the water tank 54. This space is also filled with water for transmitting cooling power from the freezing pipe 62 to the cooling tank 56 (i.e., coffee extract). On the other hand, the freezing pipe 62 contains flon gas, etc., as cooling media. The freezing pipe 62 is connected to a refrigerating compressor 64 and a condenser 66 for circling the flon gas.

The function of the guiding unit 70 will now be described in detail.

As has been described, the guide element 72 of the guiding unit 70 is movable between the first position (FIG. 4) where it can receive all coffee extract discharged from the brew hole 28 of the filter basket 26 and the second position (FIG. 3) where it does not contact the coffee extract and lets the coffee extract fall as it is.

Figure 4:
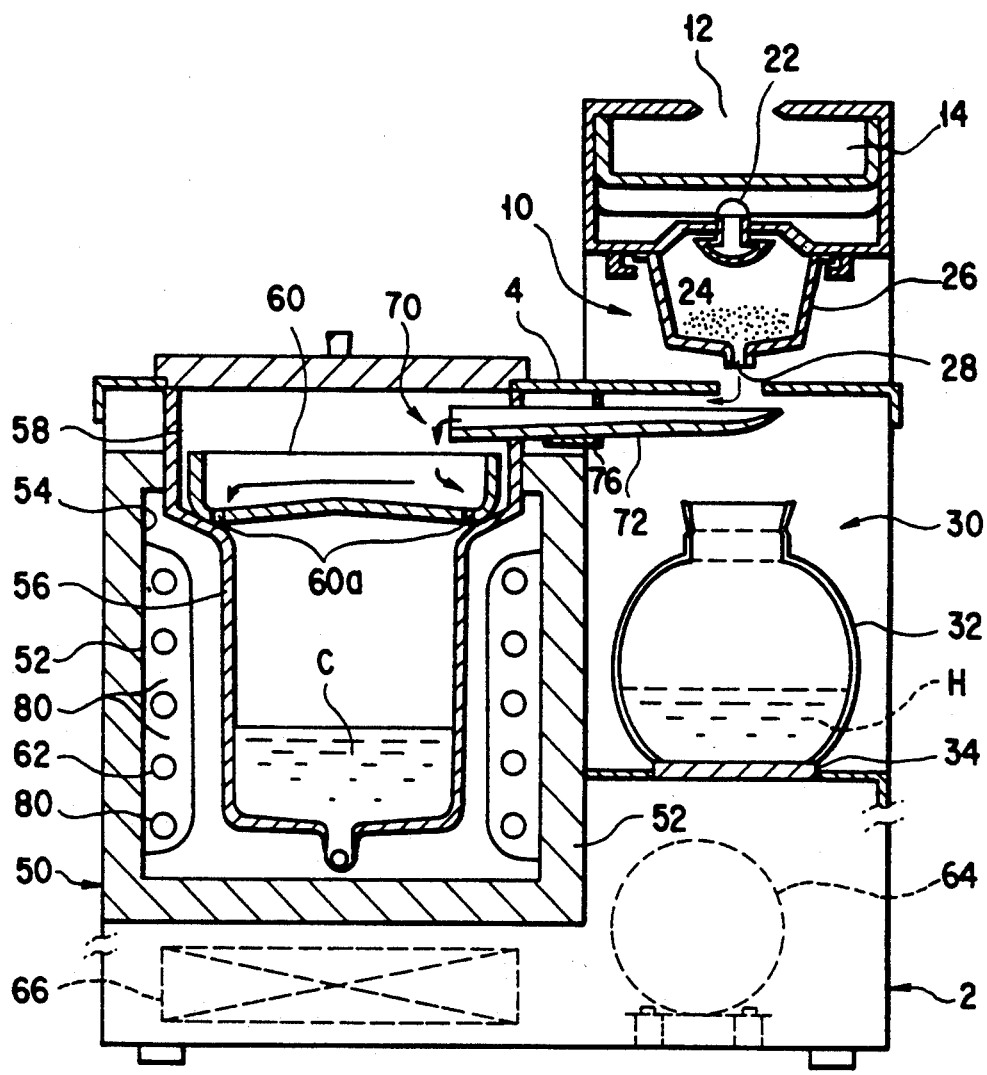
FIG. 4 is a cross-sectional view taken along line 3—3 in FIG. 2, showing the state wherein cold coffee is extracted by the coffee maker.

As is clear from FIGS. 3 and 4, the guide element 72 guides, upon the selection by the operator, the coffee extract discharged from the filter basket 26 through the brew hole 28 to either the warming unit 30 or cooling unit 50. More specifically, the guide element 72 is movably supported by a guide holder 76 (see FIG. 2) such that one end of the guide element 72 is situated above the pan 60 or cooling tank 56, and the other end of the element 72 can advance to and retreat from a location just below the brew hole 28 or brewing section 10. The guide element 72 is provided with a handle (or ever) 74 extending substantially in parallel to the surface of the top cover 4 and projects from the front face of the apparatus for allowing the operator to operate the handle 74 in front of the apparatus. By moving the handle 74, the destination of the coffee extract can easily be determined. The handle 74 is moved in parallel along a slit-like cutting 78 (see FIG. 1) having a predetermined width which can determine the amount of movement of the element 72. The guide element 72 has a slope extending, from the coffee extract receiving side towards the discharge side. Alternatively, the element 72 may be constituted by a topless open gutter having an opening extending over at least the entire longitudinal length.

When the coffee extract is served as hot coffee, the guide element 72 is moved by the handle 74 to the position shown in FIG. 3 and the coffee extract is directly let to fall from the brew hole 28. Thus, the coffee extract from the filter basket 26 is put in the pot 32 set on the warmer 34 and warmed at a temperature suitable as hot coffee.

On the other hand, when the coffee extract is served as cold coffee, the guide element 72 is moved by the handle 74 to the position shown in FIG. 4 and all coffee extract from the brew hole 28 is poured onto the pan 60 of the cooling unit 50. The pan 60 is tapered from its center towards its periphery (i.e., the center area is bulged). Since the coffee extract is guided towards the holes 60a in the peripheral area of the bottom portion of the pan 60.

The coffee extract coming from the holes 60a are then guided to the slope defined by the cooling tube 58 and the cooling tank 56. The coffee extract spreads downwards in the form of a liquid film over the inner surface of the cooling tank 56 which is cooled by the freezing pipe 62 and water. In this way, the coffee extract is received by the cooling tank 56 and further cooled to a temperature suitable as cold coffee.

The coffee extract is guided to the cooling tank 56 and cooled at a sufficiently low temperature suitable as cold coffee. Thus, cold coffee is kept in the cooling tank 56.

The handling and operation of the drinks maker 2 will now be described.

First, how to serve hot coffee H will now be described.

The handle 74 is moved to the left, as shown in FIG. 1. Of course, the guide element 72 is situated in the position shown in FIG. 3. Filter means and ground coffee beans (not shown) are supplied in the filter basket 26. In this state, water corresponding to the amount of the ground coffee beans set in the basket 26 is poured from the inlet 12 to the reservoir tank 14. The water flows to the bottom of the water heater 1 via the water pipe 20 connected to the tank 14. The incoming water raises the already boiling hot water heated by the heater element 18 and supplies the hot water into the hot water tube 22. The hot water in the tube 22 is guided to the sprinkler 24, and sprinkled on the ground coffee beans set in the basket 26. The hot water, which has been guided in the basket 26 to brew coffee extract from the ground coffee beans, i.e., the coffee extract, is put in the pot 32 of the warming unit 30 via the brew hole 28. The coffee extract or hot coffee H collected in the pot 32 is warmed at a temperature suitable as hot coffee.

On the other hand, when cold coffee C is served, the handle 74 is moved to the right position shown in FIG. 1. Of course, the guide element 72 is set in the position shown in FIG. 4. In the similar manner with the case of hot coffee H, hot water is poured in the basket 26. Since the handle 74 has been moved, the hot water, which has been guided in the basket 26 to brew coffee extract from the ground coffee beans, i.e., the coffee extract, is let to fall on the guide element 72 situated just below the brew hole 28. Then, the coffee extract is poured onto the pan 60 of the cooling unit 50.

The coffee extract coming to the pan 60 is let to fall along the inclined face (inner wall) of the cooling tube 56. The coffee extract, while cooled quickly, is contained in the cooling tank 56. While the coffee extract is contained in the cooling tank 56, it is sufficiently cooled by the freezing pipe 62, refrigerating compressor 64 and condenser 66 to a sufficiently low temperature suitable as cold coffee (the cooling temperature is sufficiently low, but higher than 0° C.).

There is a case where part of the water surrounding the periphery of the freezing pipe 62 is present in the form of ice 80. The ice 80, when melts, absorbs a large quantity of latent melting heat from the surrounding water. Therefore, the coffee extract can be cooled at a rate higher than the rate attained by the refrigerating compressor 64.

Figure 5:
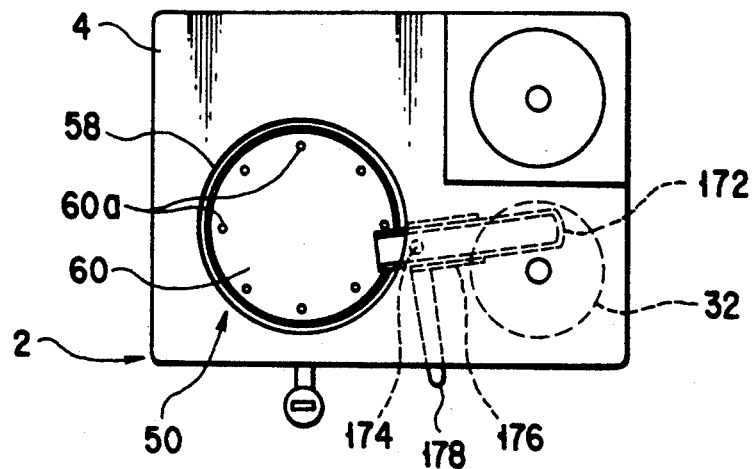
FIG. 5 is a top view taken below line 5—5 in FIG. 1, showing a modification of the coffee maker shown in FIG. 1.
Figure 6:
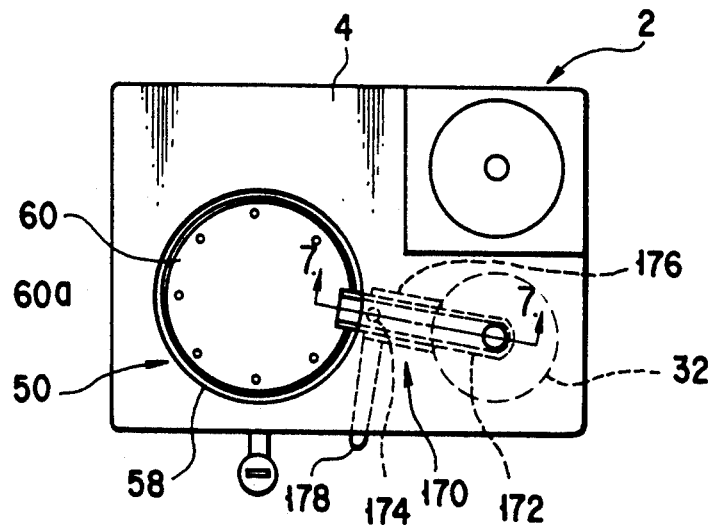
FIG. 6 is a cross-sectional view showing the state wherein cold coffee is extracted by the coffee maker shown in FIG. 5.
Figure 7:
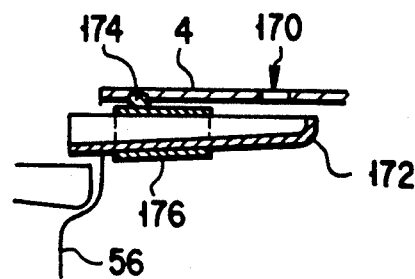
FIG. 7 is a cross sectional view taken along line 7—7 in FIG. 6.

FIGS. 5 to 7 show a modification of the abovedescribed drinks maker. The same structural elements as those in the above embodiment are denoted by like reference numerals, and a detailed description thereof is omitted.

In this modification, a guide element 172 of a guiding unit 170 is inserted in a square tube 176. The guide element 172 has a tapering from the coffee extract receiving side towards the discharge side, and the element 172 may be constituted by a (topless open) gutter having an opening extending over at least the entire longitudinal length. The square tube 176 is rotatably attached to the lower surface of the top cover 4 by means of, e.g., a pin (or a bolt and a nut, or a plastic insert member and a hole) 174. A lever 178 extending horizontally, as shown in FIG. 5 and 6, is attached at an upper part of the outer wall of the square tube 176. An end portion of the lever 178 projects from the slit-like cutting 78 (see FIG. 1), like the handle 74 in the first embodiment. In this case, the lever 178 (and tube 176 and guide element 172) is rotatable about the pin (or the plastic member and hole or bolt and nut) 174.

When the lever 178 is moved to the right along the cutting 78, the square tube 176 is rotated and accordingly the guide element 172 is retreated to the position which is not visible through the large hole (not indicated by a reference numeral) of the top cover 4. Thus, the coffee extract can fall directly into the pot 32 (that is, hot coffee can be served [see FIG. 5]).

On the other hand, when the lever 178 is moved to the left along the cutting 78, the square tube 176 is rotated and accordingly the guide element 172 is moved to the position which is visible through the large hole of the top cover 4 (just below the brew hole 28 in FIGS. 1 to 4) where the coffee extract falls. In this state, cold coffee can be served (see FIG. 6). As a matter of course, the amount of rotation of the square tube 176 (i.e. the amount of movement of the guide element 172) is determined by the length of the cutting 78. Accordingly, by setting the length of the cutting 78 at an optimal value, the guide element 172 can surely be moved to the position just below the brew hole 28. In the meantime, ribs (not shown) for determining the range of movement of the square tube 176 may be provided at desired positions on the top cover 4.

The guide element 172 can be pulled out of the square tube 176 in the longitudinal direction. In addition, since the guide element 172 has the aforementioned opening, the portion in contact with the coffee extract can be cleaned satisfactorily.

In this modification, the guide element 172 is inserted in the horizontally rotatable square tube 176; however, it is possible to change the shape of the guide element 172 so that the guide element 172 has the hole for the lever 178 and pin 174.

The above description is directed to making of coffee; however, this invention is applicable to making of tea or other drinks. Various changes and modifications can be made to the present invention without departing from the spirit of the invention.

According to the drinks maker of the present invention, both hot drink and cold drink can be served at a time by sliding the handle (or lever). When cold drink is desired, it can be quickly served without time-consuming steps such as transferring, cooling, etc. Furthermore, without using a plurality of drinks processors, hot drink (or cold drink) can be served while cold drink (or hot drink) is being extracted.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:
1. A drinks maker comprising:
   drinks dispensing means including basket means for containing a material in which hot water is poured to obtain drinks, and being capable of serving various kinds of drinks in accordance with the material;
   guiding means movable between a first position where the guiding means receives the drinks fed from the drinks dispensing means and a second position where the guiding means does not receive the drinks fed from the drinks dispensing means, the guiding means guiding the drinks discharged from the basket means to receiving means situated in accordance with the first position or the second position;
   first receiving means situated in accordance with the first position of the guiding means, the first receiving means keeping the drinks at a temperature different from the temperature which the drinks have when the drinks have just been discharged; and
   second receiving means situated in accordance with the second position of the guiding means, the second receiving means keeping the drinks at a temperature which the drinks have when the drinks have just been discharged.

2. A drinks maker according to claim 1, wherein said guiding means is linearly moved in a direction perpendicular to the direction in which the drinks fall from the basket means, between the first position and the second position.

3. A drinks maker according to claim 1, wherein said guiding means is moved along an arcuated orbit in a plane including a direction perpendicular to the direction in which the drinks fall, between the first position and the second position.

4. A drinks maker according to claim 1, wherein
   said drinks dispensing means further comprises reservoir means for containing water for making the drinks, heater means for heating the water contained in the reservoir means, and deriving means for supplying the resultant hot water to the basket means,
   said first receiving means includes a freezing element for cooling and keeping the drinks at a temperature suitable for cold drinks, and
   said second receiving means includes a warmer element for warming the drinks made by the basket means with the hot water at a temperature suitable for hot drinks.

5. A drinks maker according to claim 4, wherein said guiding means includes a guiding element for catching drinks fallen from the basket means and guiding the drinks to the first receiving means, said guiding element having an open gutter-like shape slope towards the first receiving means.

6. A drinks maker according to claim 5, wherein said guiding means includes a holding element for detachably holding the guiding element.

7. A coffee maker comprising:
   a water heating section, having a heater element and a hot water pipe, for supplying hot water obtained by the heater element to a desired position through the hot water pipe;
   a hot drinks dispensing section including
      sprinkler means, situated at an end portion of the hot water pipe of said water heating section, for sprinkling the hot water,
      a basket element situated just below the sprinkler means for containing a material in which the hot water is sprinkled to obtain hot drinks, the basket element having a discharge opening at its bottom portion for dripping the hot drinks made with the hot water, and
      a reservoir element, situated below the basket element, for keeping the hot drinks falling from the basket element;
   a cold drinks dispensing section, situated near the hot drinks dispensing section, including a cooling tank formed within a water tank and freezing means for cooling the cooling tank, the cold drinks dispensing section cooling the hot drinks fed from the hot drinks dispensing section and keeping cooled cold drinks; and
   deriver means situated between the basket element and the reservoir element of the hot drinks dispensing section, the deriver means taking a position capable of receiving the hot drinks falling from the basket element and a position not capable of receiving the hot drink falling form the basket element, thereby letting the hot drinks from the basket element fall selectively into the reservoir element or into the cooling tank of the cold drinks dispensing section.

8. A coffee maker according to claim 7, wherein said deriver means is linearly movable in a direction perpendicular to the direction in which the hot drinks fall from the discharge opening of the basket element of the hot drinks dispensing section.

9. A coffee maker according to claim 7, wherein said deriver means is moved along an arcuated orbit in a plane including a direction perpendicular to the direction in which the drinks fall from the discharge opening of the basket element of the hot drinks dispensing section.

10. A coffee maker according to claim 7, wherein said deriver means includes a guiding element for catching drinks fallen from the basket means and guiding the drinks to the cold drinks dispensing section, said guiding element having a gutter-like shape slope towards the cold drinks dispensing section.

11. A coffee maker according to claim 10, wherein said deriver means includes a holder element for detachably holding the guiding element.

* * * * *